April 20, 1937. J. L. BREESE 2,077,511
SWITCH ACTUATING ATTACHMENT FOR MOTOR VEHICLE CLUTCH PEDALS
Filed Nov. 29, 1935
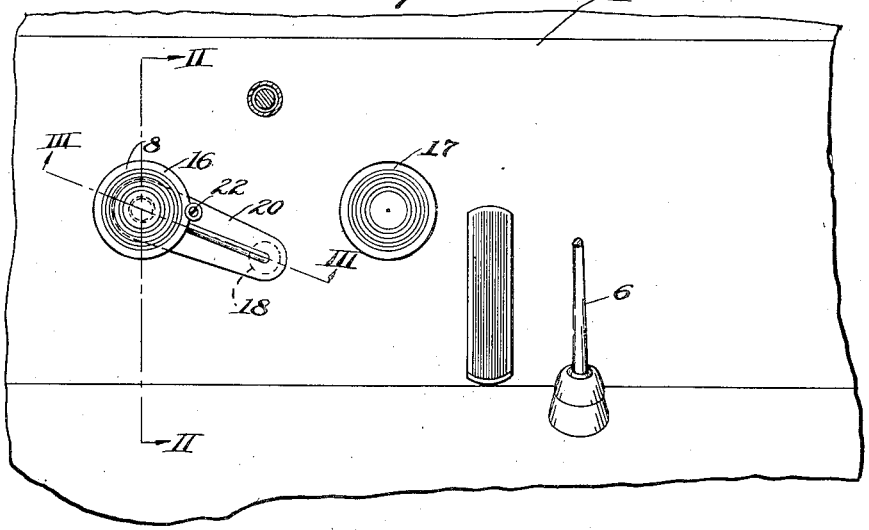
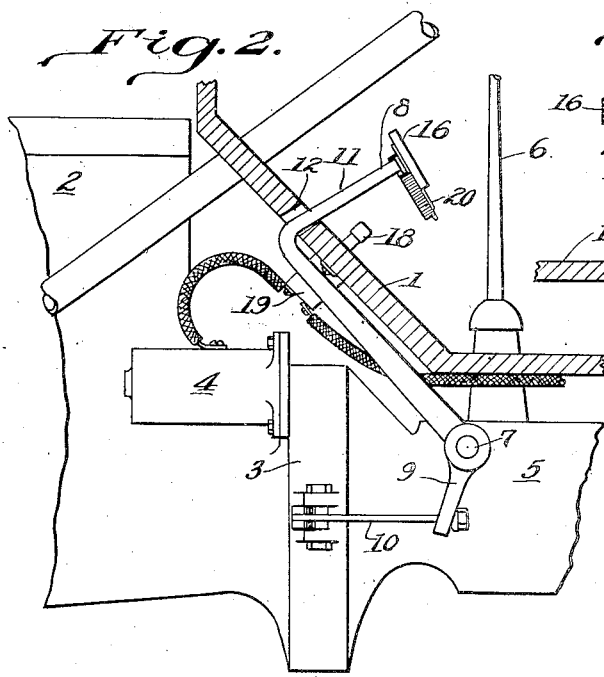
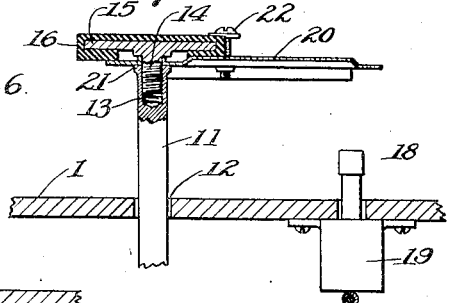
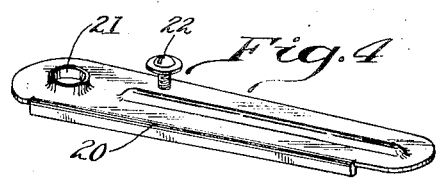
Inventor
James L. Breese Patented Apr. 20, 1937

2,077,511

UNITED STATES PATENT OFFICE 2,077,511

SWITCH ACTUATING ATTACHMENT FOR MOTOR VEHICLE CLUTCH PEDALS

James L. Breese, Santa Fe, N. Mex., assignor to Oil Devices Corporation, Columbus, Ohio, a corporation of Illinois Application November 29, 1935, Serial No. 52,115

3 Claims. (Cl. 74—480)

This invention relates to an improved clutch pedal attachment for operating the starting motor switch of a motor vehicle engine. It is a primary object of the invention to provide simple, convenient and efficient means whereby through the actuation of the clutch pedal, the engine starting switch may be closed.

In many popular types of motor vehicles, it is customary to provide a foot operated switch for opening and closing the circuit of an engine starting motor. Usually such switches comprise an actuating portion embodying a small button or plunger which is adapted to be depressed by foot pressure. Frequently such switch buttons or plungers are of small diameter and are relatively inaccessibly located so that it is a matter of some difficulty on the part of the vehicle driver to locate the button and then actuate the same. Again, it frequently happens in the operation of motor vehicles, as when a vehicle is ascending a hill and the engine becomes stalled or ceases to operate, that the driver should have both feet engaged simultaneously with the clutch and brake pedals. Under such conditions, it is difficult to manipulate the feet in order to operate the starter switch without losing control of the vehicle. Motor vehicles frequently become stalled under heavy traffic conditions or where prompt action is necessary, and the ordinary inaccessible starter switch seriously delays the driver in re-starting the engine and expeditiously effecting desired and necessary movements of the vehicle.

Therefore, in accordance with the present invention, I have provided a clutch pedal lever of the motor vehicle with a fixed laterally extending arm, which when the clutch pedal lever is fully depressed, or rocked to an extreme of movement beyond that normally required in clutch operation, the said arm at its outer end will engage with the actuating member of a starter switch, causing the closing of the starter switch and the electric starting motor circuit connected therewith, thus providing the vehicle operator with greater convenience in governing the starting of an automobile engine and to enable the operation to be promptly and effectively carried out without delay or incurring the traffic risks which such delays may involve.

It is a further object of the invention to provide a device for the purpose set forth which shall be simple to install and apply, one which is devoid of small operating parts and mechanical complication, and simple, reliable and efficient in service.

For a further understanding of the invention, reference is to be had to the following description and the accompanying drawing, in which:

Fig. 1 is a front elevation of the floor board of a motor vehicle, showing the customary foot controls of such a vehicle together with the starting device comprising the present invention and in operating position in connection with the foot operated clutch cotrol;

Fig. 2 is a vertical sectional view on the plane indicated by the line II—II of Fig. 1;

Fig. 3 is a transverse sectional view on the plane indicated by the line III—III of Fig. 1;

Fig. 4 is a detail perspective view of the starter arm comprising the present invention.

Referring more particularly to the drawing, the numeral 1 designates the floor board of a motor vehicle. Beneath and in advance of the floor board, there is arranged the usual engine 2, a clutch and fly wheel housing 3, an electric starting motor 4 and a transmission housing 5, the operating lever of which having been indicated at 6. Pivotally mounted as at 7 on either of the housings 3 or 5 is a clutch pedal lever 8, provided at its lower end with a crank extension 9 with which is engaged the usual rod 10 leading to the clutch mechanism disposed within the housing 3. The upper laterally and forwardly bent end 11 of the lever 8 extends through a slot 12 provided in the floor board 1 and terminates forwardly in a threaded socket 13. Received within this socket is a reduced threaded stud 14 which extends axially from the foot-engaging disk 15 of the lever 8. As usual, the disk 15 is protected by a rubber covering 16.

Adjacent to the lever 8, there is arranged the usual foot brake operating pedal 17, and disposed between the pedals 8 and 17 is the movable actuating extremity 18 of the starter switch 19 employed in controlling the operation of the starting motor 4. In order to operate the plunger extremity 18 of the starting switch directly from the clutch pedal, I have provided a short rigid metallic arm 20. One end of this arm is formed with an apertured boss 21 which is adapted to be removably confined between the outer end 11 of the clutch lever 8 and the back of its foot operated disk 15, so that when the disk is tightened to assume its normal operating position, one end of the arm 20 will be securely confined between the same and the lever 8 proper, thereby holding the arm in a desired operating position. This position may be controlled by oscillating said arm about the axis of the stud 14 in order to insure accurate registration between the outer or free end of the arm and the actuating extremity 18 of the starter switch. To maintain such registration, the arm is additionally provided with a threaded opening for the reception of a headed screw 22, which latter is adapted to be brought into firm frictional engagement with the peripheral portion of the covering 16 of the disk 15, as disclosed in Fig. 3 so that the arm will be positively and securely maintained in its required operating position.

It will be observed that the arm may be readily applied to the clutch pedal of a motor vehicle without disturbing existing standards. As such clutch pedals are manufactured, it is now a standard practice to removably connect the foot engaging portion of the clutch pedal with the lever extension thereof, so that in applying the arm, it is merely necessary to remove the foot engaging disk, insert the arm over the stud therefor and replace the disk in its proper operating position. The mere tightening of the screw 22 will then complete the connection and at the same time insure proper registration of the outer end of the arm with the starter switch.

The device operates very satisfactorily when thus associated with the clutch pedal. I have found that it requires a long or full stroke movement of the clutch pedal lever to bring the arm 20 into engagement with the starter switch. This movement is materially in excess of that normally required in governing the operation of the associated clutch mechanism, so that there is little or no likelihood of the vehicle driver fully depressing the clutch when the engine 2 is in operation. In prior devices for closing the circuit of a starter motor by clutch pedal actuation, it has been customary to provide mechanism responsive to the suction developed within the intake manifold of the engine for positively preventing such means from energizing the starter motor when the internal combustion engine of the vehicle is in operation. I have found that such mechanical complication may be entirely avoided and similar convenience and facility obtained by the employment of the device and mechanism set forth and, moreover, this is accomplished in a very simple manner and at low cost.

What is claimed is:

1. A starter switch operating attachment for motor vehicle clutch pedals comprising an elongated bar apertured at one end to receive the threaded stud of a detachable foot receiving disk carried by the upper end of a clutch pedal lever, whereby to confine said arm between said disk and the upper end of said lever so that the outer end of said arm is disposed in registration with an associated starter switch, the said arm being normally spaced from said starter switch to provide for normal clutch operation without contact between the arm and the starter switch.

2. In control mechanism for a motor vehicle, a clutch pedal lever having a threaded socket formed in the upper end thereof, a foot engaging head for said lever formed axially with a threaded stud disposed to be received within said socket, and an arm removably clamped between the upper end of said lever and said head and extending radially from the latter to register with the actuating extremity of a switch carried by said vehicle.

3. A member for operating the starter switch of a vehicle provided with a clutch pedal and lever therefor comprising an arm perforated at one end for the reception of a stud formed on the foot engaging disk of the vehicle clutch pedal, said disk serving to clamp said arm against the upper socketed end of the clutch pedal lever, reenforcing means extending longitudinally of said arm, and threaded mans engaging said disk to secure said arm in a position with its outer end in registration with the actuating extremity of said starter switch.

JAMES L. BREESE.